Nov. 30, 1954 W. W. FARIS 2,695,719
INSULATED CONTAINER
Filed July 2, 1949

INVENTOR:
WILLIAM W. FARIS,
By Rogers & Ezell,
ATTORNEYS.

United States Patent Office 2,695,719
Patented Nov. 30, 1954

2,695,719

INSULATED CONTAINER

William W. Faris, Webster Groves, Mo.

Application July 2, 1949, Serial No. 102,790

1 Claim. (Cl. 215—13)

The present invention relates generally to containers, and more particularly to a picnic jug.

In brief, the present device comprises an outer casing on which is removably disposed a cover having an annular central opening. A standard glass jar in which coffee or other food products is sold is suspended in the casing from the cover, there being insulation between the bottom and sides of the casing and the jar. Suspension of the jar is obtained by clamping engagement of its standard lid with a flange of the cover. The jar is readily removed, as for replacement of a broken unit, for cleaning, or for drying out of the whole unit.

Therefore, an object of the present invention is to provide a novel jug of the picnic type in which an expendible jar is susepnded within a casing and is separated from contact therewith by insulation between the sides and bottom.

Another object is to provide a novel picnic jug which includes a casing having a removable apertured cover adapted to support in suspended relation an expendible jar.

Another object is to provide a novel picnic jug which is inexpensive to manufacture, which incorporates an expendible jar, in which all of the several elements are readily separated for replacement, cleaning, and the like, which has a minimum dead weight, and which is adapted to serve well and efficiently in maintaining hot liquids or the like at high temperature and cold liquids and the like at low temperatures for extended periods of time.

The foregoing and other objects and advantages are apparent from the following description taken with the accompanying drawing, in which.

Figure 1:
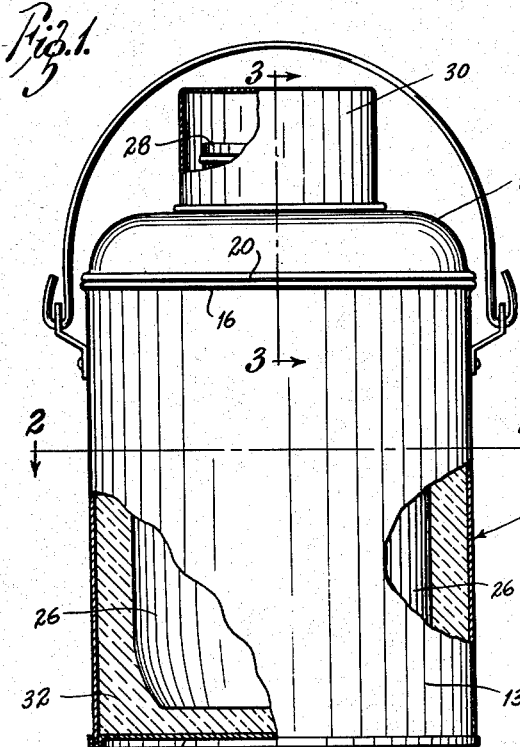
Fig. 1 is a side elevational view of a picnic jug constructed in accordance with the teachings of the present invention, portions being broken away and in section to better illustrate details.
Figure 2:
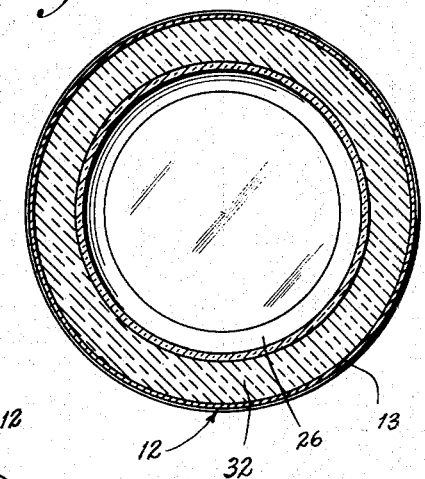
Fig. 2 is a horizontal cross-sectional view on substantially the line 2—2 of Fig. 1.
Figure 3:
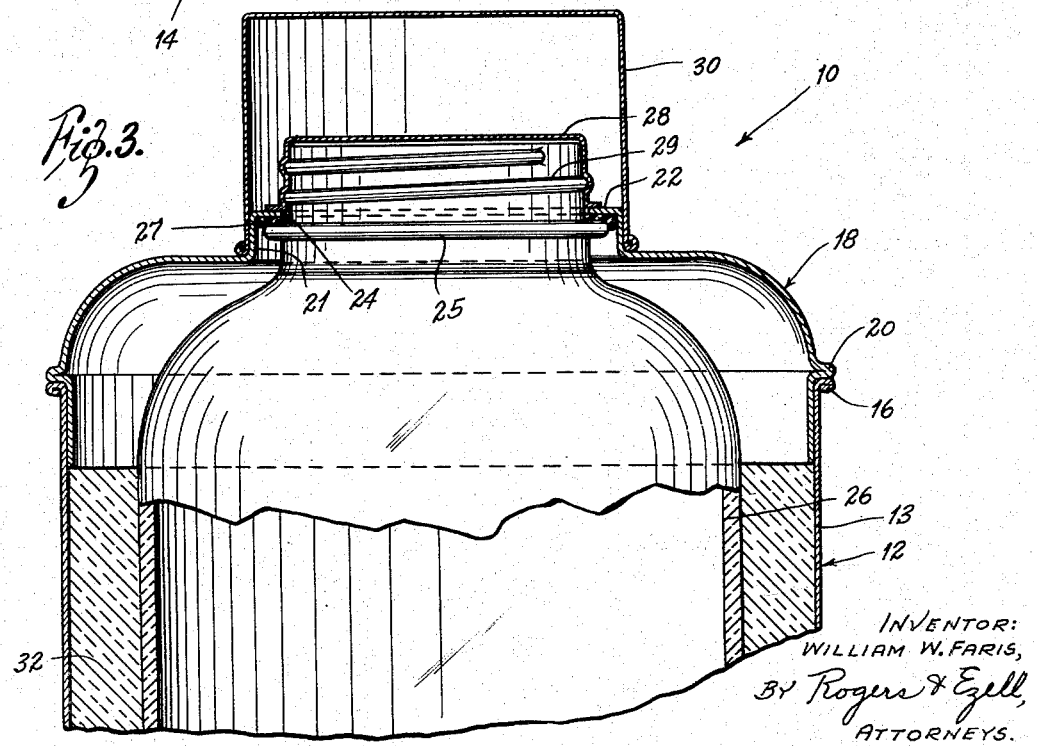
Fig. 3 is an enlarged vertical cross-sectional view on substantially the line 3—3 of Fig. 1.

Referring to the drawing more particularly by reference numerals, 10 indicates generally a picnic jug incorporating the teachings of the present invention. The jug 10 includes an outer casing 12 having a cylindrical side wall 13 and a bottom 14. The free edge of the cylindrical side wall 13 is formed as a bead 16. A cover 18 telescopically engages the upper portion of the casing 12 and is of the cross section clearly illustrated in Fig. 3, including an annular flange 20 projecting outwardly therefrom which engages the bead 16. The cover 18 includes a cylindrical portion 21 and an annular central flange 22 which defines an opening 24.

An expendible glass jar 26 is suspended within the casing 12, a standard flange 25 thereof engaging a sealing ring 27, such as a fruit jar rubber, the sealing ring 27 being forced against the under face of the flange 22 by engagement of the free edge of a standard jar top 28 with the upper face of the flange 22 through engagement of the jar top 28 with threads 29 of the jar 26. A cup 30 frictionally engages the cylindrical portion 21 of the cover 18.

Insulation 32 of any selected type is disposed between the bottoms and sides of the casing 12 and the jar 26. It is preferable to employ insulation which may become thoroughly wet without damage, and which may be dried out when desired.

In one exemplification of the jug 10, the casing 12, the cover 18, and the cup 30 are of aluminum. The jar 26 is a two-pound glass jar in which coffee is sold. The insulation may be fiber glass or other material, and may be compressible or substantially non-compressible.

It is manifest that the cup 30 may be readily removed for drinking purposes. The cover 18 may be easily pried loose from the casing 12 either after the jar cap 28 is removed from the jar 26 or before. The opening 24 is sufficiently large to readily clear the threads 29 of the jar 26, either by threading action or vertical lift as determined by the initial relationship. The insulation 32 may be removed for drying purposes or for replacement. The jar 26 is thus removable for replacement, for cleaning, or for any other reason.

Hence, an inexpensive yet efficient picnic jug is provided which fulfills all of the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invetion which is limited only by the claim which follows.

What is claimed is:

In combination, a picnic jug comprising an aluminum casing open at the top, a removable aluminum cover therefor having a portion telescopically and frictionally engaging said casing, said cover having an annular shoulder of less diameter than the cover and a central aperture of less diameter than said shoulder, said aperture being defined by an annular flange extending inwardly from said shoulder, a removable cup member frictionally engaging said shoulder, a removable standard glass jar in said casing spaced from the bottom and sides thereof, said jar having an annular outwardly extending neck flange surmounted by an externally threaded neck portion, the outside diameter of said outwardly extending flange being intermediate the inside diameter and the outside diameter of said inwardly extending flange, said threaded neck portion being freely insertable through said aperture and extending above said inwardly extending flange, a gasket between said inwardly and outwardly extending flanges in flush engagement with both flanges, a removable threaded closure member for said jar in bearing engagement with said inwardly extending flange securing said jar in rigid relation with said cover and in suspended relation with said casing, and removable insulation between the sides and bottom of said casing and said jar, said picnic jug being dismantable as aforesaid to permit replacement of said jar and to permit removal of said insulation for rapid drying when it becomes wet, said aluminum casing and cover, glass jar and insulation providing an efficient heat or cold retaining combination.

References Cited in the file of this patent

UNITED STATES PATENTS

| Number | Name | Date |
|---|---|---|
| 889,992 | Van Wye | June 9, 1908 |
| 1,489,059 | Brainard | Apr. 1, 1924 |
| 1,639,529 | Payson et al. | Aug. 16, 1927 |
| 1,684,399 | Lamb et al. | Sept. 18, 1928 |
| 1,771,123 | Johnson | July 22, 1930 |
| 1,965,028 | Bissell | July 3, 1934 |
| 2,044,093 | Mills | June 16, 1936 |
| 2,196,486 | Anderson | Apr. 9, 1940 |